United States Patent
Lee et al.

(10) Patent No.: US 9,456,455 B2
(45) Date of Patent: Sep. 27, 2016

(54) METHOD OF TRANSMITTING FEEDBACK INFORMATION IN A WIRELESS COMMUNICATION SYSTEM

(75) Inventors: Young Dae Lee, Gyeonggi-do (KR); Sung Duck Chun, Gyeonggi-do (KR); Myung Cheul Jung, Seoul (KR); Sung Jun Park, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 813 days.

(21) Appl. No.: 12/159,849

(22) PCT Filed: Jan. 5, 2007

(86) PCT No.: PCT/KR2007/000077
§ 371 (c)(1),
(2), (4) Date: Oct. 6, 2008

(87) PCT Pub. No.: WO2007/078171
PCT Pub. Date: Jul. 12, 2007

(65) Prior Publication Data
US 2009/0047912 A1   Feb. 19, 2009

Related U.S. Application Data

(60) Provisional application No. 60/757,063, filed on Jan. 5, 2006.

(30) Foreign Application Priority Data

Jan. 2, 2007   (KR) .................. 10-2007-0000097

(51) Int. Cl.
*H04B 7/00*     (2006.01)
*H04W 72/12*   (2009.01)
(Continued)

(52) U.S. Cl.
CPC ........ *H04W 72/1289* (2013.01); *H04L 1/0028* (2013.01); *H04L 1/1671* (2013.01);
(Continued)

(58) Field of Classification Search
CPC . H04L 1/0025; H04L 1/0026; H04L 1/0028; H04L 1/1671; H04L 1/1812; H04L 5/0007; H04L 5/0053; H04L 5/006; H04L 5/0064; H04L 5/0091; H04W 28/04; H04W 28/18
See application file for complete search history.

(56) References Cited

U.S. PATENT DOCUMENTS 5,659,756 A   8/1997   Hefferon et al.
5,754,754 A   5/1998   Dudley et al.
(Continued)

FOREIGN PATENT DOCUMENTS

CN   1315121   9/2001
CN   1346191   4/2002
(Continued)

OTHER PUBLICATIONS

Philips: "Evolved Paging Indicators for LTE", 3GPP TSG-RAN WG2, R2-052985 [online], Nov. 7, 2005. [retrieved on Aug. 25, 2008]. Retrieved from the internet: <http://www.3gpp.org/FTP/tsg_ran/WG2_RL2/TSGR2_49/Documents/R2-052985.zip>, p. 1, 2.
(Continued)

*Primary Examiner* — Zhiyu Lu
(74) *Attorney, Agent, or Firm* — Lee Hong Degerman Kang & Waimey; Jonathan Kang; Jeffrey Lotspeich

(57) ABSTRACT

A method of transmitting feedback information at a user equipment (UE) in a wireless communication system comprising a network and a plurality of UEs is disclosed, the method comprising receiving information associated with a time-frequency region for transmitting feedback information related with downlink data, the time-frequency region being dynamically allocated by the network, receiving the downlink data from the network, and transmitting the feedback information for the downlink data to the network on the time-frequency region.

5 Claims, 6 Drawing Sheets

(51) Int. Cl.
*H04L 1/16* (2006.01)
*H04L 5/00* (2006.01)
*H04W 28/18* (2009.01)
*H04L 1/00* (2006.01)
*H04L 1/18* (2006.01)

(52) U.S. Cl.
CPC ........... *H04L5/0007* (2013.01); *H04L 5/0053* (2013.01); *H04L 5/0091* (2013.01); *H04W 28/18* (2013.01); *H04W 72/1263* (2013.01); *H04L 1/0025* (2013.01); *H04L 1/0026* (2013.01); *H04L 1/1812* (2013.01); *H04L 5/006* (2013.01); *H04L 5/0064* (2013.01)

(56) References Cited

U.S. PATENT DOCUMENTS

| | | |
|---|---|---|
| 5,828,677 A | 10/1998 | Sayeed et al. |
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,421,540 B1 | 7/2002 | Gilhousen et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,054,289 B1 | 5/2006 | Foster, Jr. et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,673,211 B2 | 3/2010 | Meyer et al. |
| 7,729,719 B2 | 6/2010 | Bergstrom et al. |
| 7,778,599 B2 * | 8/2010 | Li et al. .......................... 455/39 |
| 7,826,859 B2 | 11/2010 | Lee et al. |
| 7,839,829 B2 | 11/2010 | Lee et al. |
| 7,848,308 B2 | 12/2010 | Lee et al. |
| 7,881,724 B2 | 2/2011 | Park et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 8,098,644 B2 | 1/2012 | Xiao et al. |
| 2001/0021197 A1 | 9/2001 | Foore et al. |
| 2001/0024956 A1 | 9/2001 | You et al. |
| 2001/0030953 A1 | 10/2001 | Chang |
| 2001/0046864 A1 | 11/2001 | Bhatoolaul et al. |
| 2002/0009067 A1 | 1/2002 | Sachs et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0048316 A1 | 4/2002 | Imaizumi et al. |
| 2002/0071480 A1 | 6/2002 | Marjelund et al. |
| 2002/0080887 A1 * | 6/2002 | Jeong et al. ................... 375/295 |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0031119 A1 | 2/2003 | Kim et al. |
| 2003/0035440 A1 | 2/2003 | Casaccia et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0210669 A1 | 11/2003 | Vayanos et al. |
| 2003/0223393 A1 | 12/2003 | Lee |
| 2003/0223452 A1 | 12/2003 | Toskala et al. |
| 2003/0236085 A1 | 12/2003 | Ho |
| 2004/0001452 A1 | 1/2004 | Day et al. |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0144593 A1 | 7/2004 | Shai |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0160919 A1 | 8/2004 | Balachandran et al. |
| 2004/0171395 A1 | 9/2004 | Shin |
| 2004/0176094 A1 * | 9/2004 | Kim et al. ..................... 455/438 |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |

(56) References Cited

U.S. PATENT DOCUMENTS

| | | |
|---|---|---|
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0013272 A1 | 1/2005 | Hwang et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1 | 2/2005 | Torsner |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0068963 A1 | 3/2005 | Lee et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0114489 A1 | 5/2005 | Yonge, III et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0138528 A1 | 6/2005 | Ameigeiras et al. |
| 2005/0157678 A1 | 7/2005 | Mantha et al. |
| 2005/0157696 A1 | 7/2005 | Yamamoto |
| 2005/0176474 A1* | 8/2005 | Lee ............... H04B 7/26 455/574 |
| 2005/0185608 A1 | 8/2005 | Lee et al. |
| 2005/0186973 A1 | 8/2005 | Gaal et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0201474 A1* | 9/2005 | Cho .............. H04L 1/0003 375/260 |
| 2005/0207374 A1 | 9/2005 | Petrovic et al. |
| 2005/0213605 A1 | 9/2005 | Kim et al. |
| 2005/0220049 A1 | 10/2005 | Zhang et al. |
| 2005/0232158 A1 | 10/2005 | Hondo |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0259662 A1 | 11/2005 | Kim et al. |
| 2005/0260997 A1 | 11/2005 | Korale et al. |
| 2005/0265301 A1 | 12/2005 | Heo et al. |
| 2005/0271025 A1 | 12/2005 | Guethaus et al. |
| 2005/0277429 A1 | 12/2005 | Laroia et al. |
| 2005/0281212 A1 | 12/2005 | Jeong et al. |
| 2005/0281219 A1 | 12/2005 | Kim et al. |
| 2005/0281222 A1 | 12/2005 | Ranta-Aho et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0011953 A1 | 1/2006 | Nakahashi et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1 | 4/2006 | Teague et al. |
| 2006/0088009 A1 | 4/2006 | Gibbs et al. |
| 2006/0120403 A1 | 6/2006 | Murata et al. |
| 2006/0143300 A1 | 6/2006 | See et al. |
| 2006/0146745 A1 | 7/2006 | Cai et al. |
| 2006/0146751 A1 | 7/2006 | Obuchi et al. |
| 2006/0153232 A1 | 7/2006 | Shvodian |
| 2006/0154680 A1 | 7/2006 | Kroth et al. |
| 2006/0156370 A1* | 7/2006 | Parantainen ............ 725/132 |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0258383 A1 | 11/2006 | Jiang et al. |
| 2006/0282739 A1 | 12/2006 | Meyer et al. |
| 2006/0292982 A1 | 12/2006 | Ye et al. |
| 2007/0060146 A1* | 3/2007 | Won et al. .............. 455/445 |
| 2007/0076680 A1 | 4/2007 | Amram et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0098115 A1* | 5/2007 | Bachl et al. ............. 375/343 |
| 2007/0099619 A1 | 5/2007 | Parekh et al. |
| 2007/0104151 A1 | 5/2007 | Papasakellariou et al. |
| 2007/0110101 A1 | 5/2007 | Wu |
| 2007/0117579 A1 | 5/2007 | Cai et al. |
| 2007/0121543 A1* | 5/2007 | Kuchibhotla et al. ......... 370/329 |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147315 A1 | 6/2007 | Khoury et al. |
| 2007/0147326 A1 | 6/2007 | Chen |
| 2007/0149206 A1 | 6/2007 | Wang et al. |
| 2007/0191054 A1 | 8/2007 | Das et al. |
| 2007/0206531 A1 | 9/2007 | Pajukoski et al. |
| 2007/0218930 A1 | 9/2007 | Kuo |
| 2007/0254595 A1* | 11/2007 | Yoon et al. ............. 455/67.14 |
| 2007/0254662 A1 | 11/2007 | Khan et al. |
| 2007/0274253 A1 | 11/2007 | Zhang et al. |
| 2008/0004054 A1 | 1/2008 | Barbaresi et al. |
| 2008/0031253 A1 | 2/2008 | Kim et al. |
| 2008/0043619 A1 | 2/2008 | Sammour et al. |
| 2008/0069031 A1* | 3/2008 | Zhang et al. ............. 370/328 |
| 2008/0076359 A1 | 3/2008 | Charpentier et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2008/0285501 A1 | 11/2008 | Zhang et al. |
| 2009/0052388 A1 | 2/2009 | Kim et al. |
| 2009/0109912 A1 | 4/2009 | DiGirolamo et al. |
| 2009/0129330 A1 | 5/2009 | Kim et al. |
| 2009/0156194 A1 | 6/2009 | Meylan |
| 2009/0163211 A1 | 6/2009 | Kitazoe et al. |
| 2009/0175241 A1 | 7/2009 | Ohta et al. |
| 2009/0175253 A1 | 7/2009 | Wu et al. |
| 2009/0201948 A1 | 8/2009 | Patwardhan et al. |
| 2009/0238141 A1 | 9/2009 | Damnjanovic et al. |
| 2009/0319850 A1 | 12/2009 | Baek et al. |
| 2009/0323624 A1 | 12/2009 | Kim |
| 2009/0323646 A1 | 12/2009 | Ketchum et al. |
| 2010/0014430 A1 | 1/2010 | Oka |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2011/0038376 A1 | 2/2011 | Wiemann et al. |

FOREIGN PATENT DOCUMENTS

| | | |
|---|---|---|
| CN | 1411668 | 4/2003 |
| CN | 1430359 | 7/2003 |
| CN | 1476267 | 2/2004 |
| CN | 1565140 | 1/2005 |
| CN | 1649285 | 8/2005 |
| CN | 1656840 | 8/2005 |
| CN | 1663158 | 8/2005 |
| CN | 1669350 | 9/2005 |
| CN | 1692661 | 11/2005 |
| DE | 10305358 | 7/2004 |
| DE | 10337828 | 4/2005 |
| EP | 1088415 | 12/1999 |
| EP | 0978958 | 2/2000 |
| EP | 1009184 | 6/2000 |
| EP | 1041850 | 10/2000 |

(56) References Cited

FOREIGN PATENT DOCUMENTS

| | | |
|---|---|---|
| EP | 1172766 | 1/2002 |
| EP | 1213939 | 6/2002 |
| EP | 1261222 A1 | 11/2002 |
| EP | 1315342 | 5/2003 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |
| EP | 1511245 | 3/2005 |
| EP | 1551113 | 7/2005 |
| EP | 1557968 | 7/2005 |
| EP | 1599063 | 11/2005 |
| EP | 1605724 | 12/2005 |
| EP | 1684538 | 7/2006 |
| JP | 6-013959 | 1/1994 |
| JP | 06-121001 | 4/1994 |
| JP | 9-055693 | 2/1997 |
| JP | 1997-186704 | 7/1997 |
| JP | 9-327072 | 12/1997 |
| JP | 11-177621 | 7/1999 |
| JP | 11-215192 | 8/1999 |
| JP | 11-308671 | 11/1999 |
| JP | 11331949 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002064589 | 2/2002 |
| JP | 2002-135231 | 5/2002 |
| JP | 2002-374321 | 12/2002 |
| JP | 2003-008635 | 1/2003 |
| JP | 2003078480 | 3/2003 |
| JP | 2003-116172 | 4/2003 |
| JP | 2003174470 | 6/2003 |
| JP | 2003333661 | 11/2003 |
| JP | 2004-128967 | 4/2004 |
| JP | 2004-320165 | 11/2004 |
| JP | 2004312771 | 11/2004 |
| JP | 2004-343258 | 12/2004 |
| JP | 2004-349884 | 12/2004 |
| JP | 2005072634 | 3/2005 |
| JP | 2005-517369 | 6/2005 |
| JP | 2005217743 | 8/2005 |
| JP | 2005525066 | 8/2005 |
| JP | 2005-236988 | 9/2005 |
| JP | 2005-237013 | 9/2005 |
| JP | 2005-244958 | 9/2005 |
| JP | 2005278167 | 10/2005 |
| JP | 2005-536168 | 11/2005 |
| JP | 2005-539462 | 12/2005 |
| JP | 2006-14372 | 1/2006 |
| JP | 2006-020044 | 1/2006 |
| JP | 2006025437 | 1/2006 |
| JP | 2006-505998 | 2/2006 |
| JP | 2006352705 | 12/2006 |
| JP | 2009-284532 | 12/2009 |
| KR | 10-2001-0111634 | 12/2001 |
| KR | 10-2001-0111637 | 12/2001 |
| KR | 20020077817 | 10/2002 |
| KR | 20020096900 | 12/2002 |
| KR | 10-2004-0048675 | 6/2004 |
| KR | 10-2004-0058638 | 7/2004 |
| KR | 10-2004-0064867 | 7/2004 |
| KR | 10-2004-089937 | 10/2004 |
| KR | 10-2005-0019945 | 3/2005 |
| KR | 1020050029395 | 3/2005 |
| KR | 10-2005-0031268 | 4/2005 |
| KR | 10-2005-0046305 | 5/2005 |
| KR | 10-2005-0073237 | 7/2005 |
| KR | 10-2005-0078635 | 8/2005 |
| KR | 10-2005-0078636 | 8/2005 |
| KR | 10-2005-0078640 | 8/2005 |
| KR | 10-2005-0081511 | 8/2005 |
| KR | 10-2005-0081836 | 8/2005 |
| KR | WO2005/074312 | * 8/2005 ............... H04Q 7/34 |
| KR | 10-2005-0110533 | 11/2005 |
| KR | 1020050119054 | 12/2005 |
| RU | 2168278 | 5/2001 |
| RU | 2191479 | 10/2002 |
| RU | 2232469 | 7/2004 |
| RU | 2237380 | 9/2004 |
| RU | 2232477 | 10/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 576027 | 2/2004 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 200605549 | 2/2006 |
| TW | I253824 | 4/2006 |
| WO | 94/09597 | 4/1994 |
| WO | 98/47302 | 10/1998 |
| WO | 98/49857 | 11/1998 |
| WO | 99/44383 | 9/1999 |
| WO | 99/63713 A1 | 9/1999 |
| WO | 9960729 | 11/1999 |
| WO | 01/05068 | 1/2001 |
| WO | 01/20924 | 3/2001 |
| WO | 01/35586 | 5/2001 |
| WO | 01/35692 | 5/2001 |
| WO | 01/37473 | 5/2001 |
| WO | 01/86888 | 11/2001 |
| WO | 02/03720 | 1/2002 |
| WO | 02/39697 | 5/2002 |
| WO | 02/43403 | 5/2002 |
| WO | 0239760 A2 | 5/2002 |
| WO | 02/47417 A1 | 6/2002 |
| WO | 02-075442 | 9/2002 |
| WO | 02-102110 | 12/2002 |
| WO | 03/007636 A1 | 1/2003 |
| WO | 03/017688 | 2/2003 |
| WO | 03/017691 A2 | 2/2003 |
| WO | 03/043259 A1 | 5/2003 |
| WO | 03/047155 | 6/2003 |
| WO | 03/055142 | 7/2003 |
| WO | 03/056723 A1 | 7/2003 |
| WO | 03/069934 | 8/2003 |
| WO | 03/087978 | 10/2003 |
| WO | 03/096571 | 11/2003 |
| WO | 2004/030393 | 4/2004 |
| WO | 2004034656 A2 | 4/2004 |
| WO | 2004/043012 | 5/2004 |
| WO | 2004045234 | 5/2004 |
| WO | 2004/075442 | 9/2004 |
| WO | 2004/079971 | 9/2004 |
| WO | 2004-089030 | 10/2004 |
| WO | 2004/091130 | 10/2004 |
| WO | 2004/100598 | 11/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005/048616 | 5/2005 |
| WO | 2005055472 | 6/2005 |
| WO | 2005/071887 | 8/2005 |
| WO | 2005/072073 | 8/2005 |
| WO | 2005078967 | 8/2005 |

(56) References Cited

FOREIGN PATENT DOCUMENTS

| WO | WO 2005/074312 | 8/2005 |
|---|---|---|
| WO | WO 2005/088886 | 9/2005 |
| WO | 2005-099125 | 10/2005 |
| WO | 2005/109695 | 11/2005 |
| WO | 2005/109837 | 11/2005 |
| WO | 2005/114884 | 12/2005 |
| WO | 2005/117317 | 12/2005 |
| WO | 2005-125125 | 12/2005 |
| WO | 2005119941 | 12/2005 |
| WO | 2006/012946 | 2/2006 |
| WO | 2006/033552 | 3/2006 |
| WO | 2006/118393 | 11/2006 |
| WO | 2007/066883 | 6/2007 |
| WO | 2007078155 | 7/2007 |
| WO | 2007/095966 | 8/2007 |

OTHER PUBLICATIONS

Sarka, S. et al.: Common-Channel Soft Handoff in cdma 2000—The Paging Channel. IEEE Transactions on Microwave Theory and Techniques. Jun. 2000. vol. 48, No. 6, pp. 938 to 950.

NTT Docomo, et al.: "Paging Channel Structure for E-UTRA Downlink", 3GPP TSG-RAN WG1, R1-060034 [online], Jan. 23, 2006. [retrieved on Aug. 25, 2008 from the internet: <http://www3gpp1.org/ftp/tsg_ran/WG1_RL1/TSGR1_AH/LTE_AH_January-06/Docs/R1-060034.zip>.

Motorola: "Paging Channel Design for E-UTRA", 3GPP TSG-RAN WG1, R1-061712 [online], Jun. 27, 2006 [retrieved on Aug. 25, 2008 from the internet: <http://www.3gpp1.org/ftp/tsg_ran/WG1_RL1/TSGR1_AH/LTE_AH_June-06/Docs/R1-061712.zip>.

LG Electronics Inc.: "Framing in the MAC entity", 3GPP TSG-RAN WG2, R2-061012 [online], Mar. 27, 2006 [retrieved on Jul. 10, 2008. Retrieved from internet: <http://www.3gpp.org/ftp/TSG_RAN/WG2_RL2/TSGR2_52/Documents/R2-061012.zip>.

LG Electronics Inc.: "HARQ and ARQ Operation", 3GPP TSG-RAN WG2, R2-060106 [online], Jan. 9, 2006 [retrieved on Jul. 10, 2008 from the internet <http://www.3gpp1.org/ftp/tsg_ran/WG2_RL2/TSGR2_50/Documents/R2-060106.zip>.

NTT Docomo, et al., "Multiplexing Method of Shared Control Channel in Uplink Single-Carrier FDMA Radio Access," 3GPP TSG-RAN WG1, Oct. 10, 2005, R1-051143, San Diego, CA.

Zdarsky, F.A., et al.,"Handover in Mobile Communication Networks: Who Is in Control Anyway?", Proceedings of the 30th Annual EUROMICRO Conference, Aug. 31, 2004, XP10723593.

Ericsson, "E-UTRA Random Access," 3GPP TSG-RAN WG1, R1-051445, XP003020958, Nov. 7, 2005.

Derryberry, R.T., et al.,"On CDMA 2000 Evolution—Reverse High-Speed Packet Data Physical Layer Enhancements in CDMA 2000 1xEV-DV," IEEE Communications Magazine, vol. 43, Issue 4, pp. 41-47, XP001228792, Apr. 18, 2005.

Chung, J., et al.,"Packet Synchronization and Identification for Incremental Redundancy Transmission in FH-CDMA Systems," 3rd IEEE International Symposium on Personal, Indoor and Mobile Radio Communications, pp. 292-295, XP010107082, Oct. 19, 1992.

Xu, H., et al.; "Performance Analysis on the Radio Link Control Protocol of UMTS System"; 2002 IEEE 56th Vehicular Technology Conference Proceedings; pp. 2026-2030; Sep. 2002.

Huawei "Further considerations on multiplexing method of shared Control Channel in Uplink Single-Carrier FDMA" TSG-RAN WG1 #43, Nov. 7-11, 2005.

Fujitsu, et al. "Multiplexing method of shared control channel in uplink single-carrier FDMA radio access" TSG-RAN WG1 #42bis, Oct. 10-14, 2005.

Haardt, M., et al., "The TD-CDMA Based UTRA TDD Mode," IEEE Journal on Selected Areas in Communications, vol. 18, No. 8, pp. 1375-1385, Aug. 2000.

LG Electronics Inc., "UE state transition in LTE_ACTIVE," 3GPP TSG-RAN WG2#52, R2-061002, Mar. 27, 2006, XP050130928.

Ericsson, "LTE States in E-UTRAN," 3GPP TSG-RAN WG2 Meeting #48bis, R2-052425, Oct. 10, 2005, XP050129534.

Motorola et al., "MAC-e/es header and functional split," R2-042360, 3GPP TSG RAN WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

Qualcomm, "Need for MAC-hs segmentation mechanism," R2-020769, 3GPP TSG-RAN WG2 Meeting #28, Apr. 2002.

3rd Generation Partnership Project (3GPP), "LTE; Evolved Universal Terrestrial Radio Access (E-UTRA) Medium Access Control (MAC) Protocol Specification (Release 8)," 3GPP TS 36.321 v8.4.0, Jan. 2009.

Ericsson, "Solution for Sending NAS Together with RRC Connection Request," R2-071817, 3GPP TSG-RAN WG2#58, May 2007.

LG Electronics Inc., "Default SRB for initial access," R2-061958, 3GPP TSG-RAN WG2 LTE Ad-hoc, Jun. 2006.

QUALCOMM, "Need for MAC-hs segmentation mechanism," 3GPP TSG-RAN WG2 meeting #28, R2-020769, Apr. 2002.

3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.

Philips, "Random Access considerations and discussion of L1 questions from RAN2", R1-060143, 3GPP TSG RAN WG1 LTE Adhoc, Jan. 2006, 3 pages, XP050417365A.

RAN2, "LTE L1 related questions to RAN1", R1-060061, 3GPP TSG RAN WG1 LTE Ad Hoc Meeting, Jan. 2006, 3 pages, XP050491669A.

Ericsson, "Initial, Random Access and Identity Handling", R2-060592, TSG RAN WG2 Meeting #51, Feb. 2006, XP050130549A.

European Patent Office Application Serial No. 11004852.7, Search Report dated Nov. 5, 2012, 9 pages.

3rd Generation Partnership Project (3GPP), "Technical Specification Group Geran; Packet-switched handover for GERAN A/Gb mode; Stage 2 (Release 6)", 3GPP TS 43.129 V6.6.0, Jan. 2006, 70 pages, XP50378285.

European Patent Office Application Serial No. 06812408.0, Search Report dated Nov. 22, 2012, 6 pages.

3rd Generation Partnership Project (3GPP); "Technical Specification Group Radio Access Network; Introduction of the Multimedia Broadcast Multicast Service (MBMS) in the Radio Access Network (RAN); Stage 2 (Release 6)", 3GPP TS 25.346, V6.7.0, Dec. 2005.

IPWireless, "Layer 2 functions for LTE", R2-052377, 3GPP TSG RAN WG2 #48bis, Oct. 2005.

LG Electronics Inc., "MAC Architecture of LTE", R2-060105, 3GPP TSG-RAN WG2 #50, Jan. 2006.

LG Electronics Inc., "HARQ and ARQ Operation", R2-060563, 3GPP TSG-RAN WG2 #51, Feb. 2006.

LG Electronics Inc., "Discussion on RLC PDU Structure", R2-070721, 3GPP TSG-RAN WG2 #57, Feb. 2007.

QUALCOMM, "Max Number of MAC-hs header extensions," R2-042023, 3GPP TSG-RAN WG2 meeting #44, Sep. 29, 2004, XP050126646.

QUALCOMM Europe, "Access procedure for LTE", R2-060362, 3GPP TSG-RAN WG2 LTE, Feb. 2006, 4 pages.

European Patent Office Application Serial No. 07700868.8, Search Report dated Nov. 2, 2012, 7 pages.

In the U.S. Appl. No. 13/410,221, Non-Final Office Action dated Oct. 15, 2012, 12 pages.

In the European Search Report Application Serial No. 07700865 dated Nov. 8, 2012, 6 pages.

U.S. Appl. No. 12/159,981, Office Action dated Jan. 18, 2013, 11 pages.

3rd Generation Partnership Project (3GPP), "Universal Mobile Telecommunications System (UMTS); Radio interface protocol architecture (3GPP TS 25.301 version 6.4.0 Release 6)", ETSI TS 125 301, V6.4.0, Sep. 2005, 50 pages (relevant pp. 1-48).

European Patent Office Application Serial No. 07700814.2, Summons to Attend Oral Proceedings dated Feb. 18, 2013, 9 pages.

European Patent Office Application Serial No. 07700867.0 Search Report dated Feb. 27, 2013, 9 pages.

(56) References Cited

OTHER PUBLICATIONS

Korean Intellectual Property Office Application Serial No. 10-2006-0088273, Notice of Allowance dated Mar. 28, 2013, 2 pages.
European Patent Office Application Serial No. 11001176.4, Search Report dated Oct. 24, 2012, 8 pages.
Nortel, "Proposal for the Uplink Multiple Access Scheme for E-UTRA," 3GPP TSG RAN WG1 #42bis, R1-051165, Oct. 2005, 18 pages.
Intellectual Property Office of India Application Serial No. 2299/KOLNP/2008, Office Action dated Jun. 27, 2013, 1 page.
U.S. Appl. No. 13/677,232, Office Action dated Apr. 25, 2014, 7 pages.
RAN WG2, "Answer to RAN1 questions on MBMS," 3GPP RAN WG2 Meeting #43, R2-041907, Aug. 2004, 4 pages.
European Patent Office Application Serial No. 07708430.9, Search Report dated Jun. 5, 2013, 9 pages.
European Patent Office Application Serial No. 07700845.6, Office Action dated May 22, 2013, 6 pages.
European Patent Office Application Serial No. 07700843.1, Search Report dated Nov. 28, 2013, 8 pages.
Motorola, Inc., "Technical Overview of 1xEV-DV," Version: G1.4, Sep. 2002, 24 pages.
U.S. Appl. No. 13/840,738, Office Action dated May 18, 2015, 9 pages.
U.S. Appl. No. 13/874,199, Office Action dated Oct. 26, 2015, 12 pages.
U.S. Appl. No. 14/109,801, Notice of Allowance dated Sep. 24, 2015, 8 pages.
China Mobile, "RRC States Analysis in LTE," 3GPP TSG RAN WG2#48, R2-052140, Aug. 29, 2005.
Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
Qualcomm Europe, "Signaling Optimization for E-UTRAN," 3GPP TSG-RAN WG2 Meeting #48-bis, R2-052407, Oct. 10, 2005.
PCT International Application No. PCT/KR2007/000051, Notification of Transmittal of the International Search Report dated Jul. 28, 2008, 4 pages.
Taiwan Intellectual Property Office Application Serial No. 096104519, Office Action dated Apr. 17, 2013, 3 pages.
The State Intellectual Property Office of the People's Republic of China Application Serial No. 201110399482.9, Office Action dated Aug. 21, 2013, 6 pages.
Korean Intellectual Property Office Application Serial No. 10-2006-0107104, Notice of Allowance dated Apr. 12, 2013, 2 pages.
Taiwan Intellectual Property Office Application Serial No. 096100583, Search Report dated Mar. 18, 2013, 8 pages.

\* cited by examiner

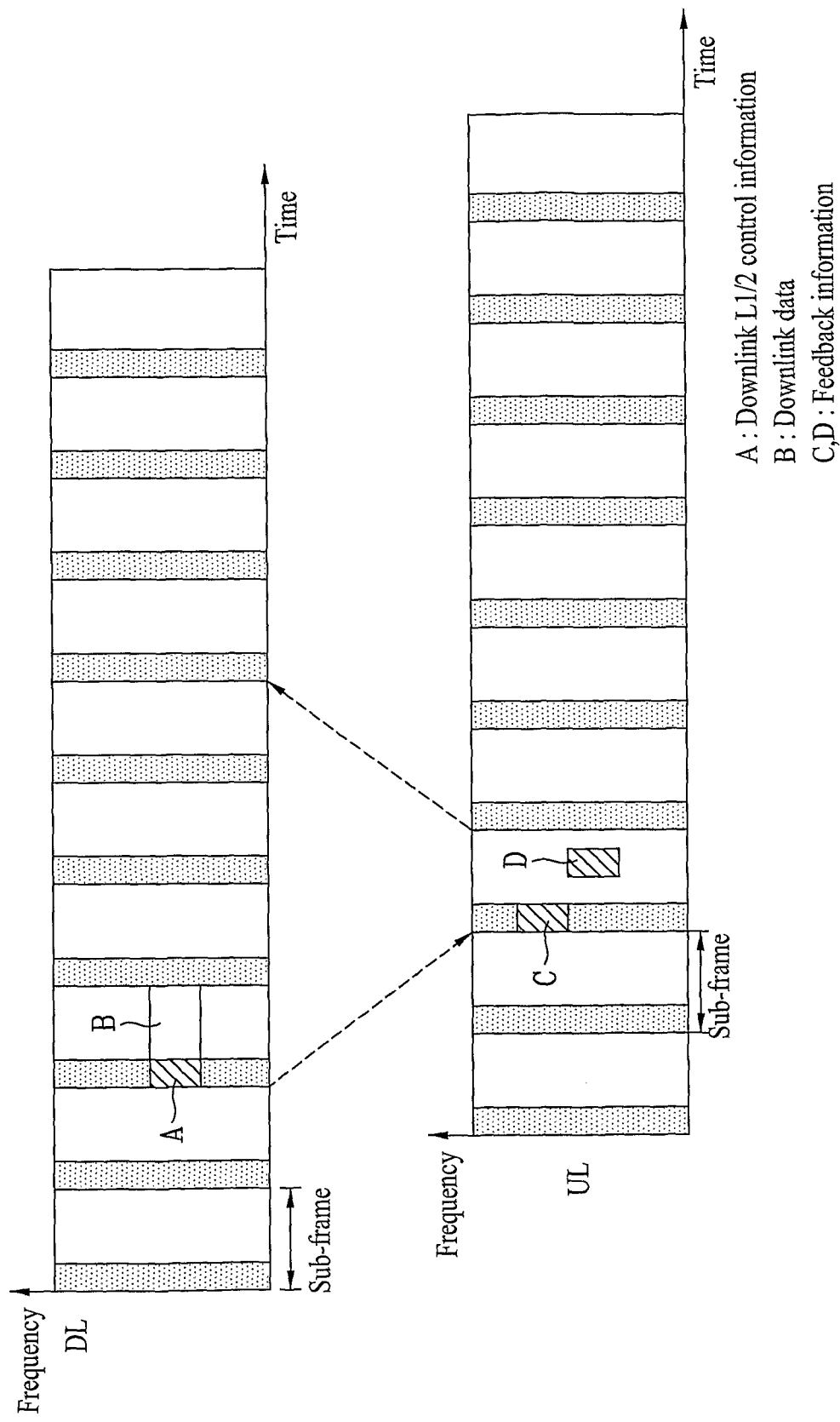

METHOD OF TRANSMITTING FEEDBACK INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2007/000077, filed on Jan. 5, 2007, which claims the benefit of earlier filing date and right of priority to Korean Patent Application No. 10-2007-0000097, filed on Jan. 2, 2007, and also claims the benefit of U.S. Provisional Application No. 60/757,063, filed on Jan. 5, 2006.

TECHNICAL FIELD

The present invention relates to a wireless communication system, more particularly, to a method of transmitting feedback information in a wireless communication system.

BACKGROUND ART

Recently, an adaptive modulation and coding (AMC) scheme and an auto repeat request (ARQ) or a hybrid auto repeat request (HARQ) scheme are generally used in a mobile communication system in order to enhance a throughput so that an efficient communication can be performed.

In the AMC scheme, a modulation and a channel coding manner in a transmitting side are changed in accordance with a channel status when the transmitting side transmits data to a receiving side. The transmitting side can find the channel status by itself, but in general the receiving side measures the channel status and informs the transmitting side of the result so that the transmitting side obtains channel status information. The channel status information can be called channel quality information.

In the ARQ or HARQ scheme, the receiving side informs the transmitting side whether data received from the transmitting side has an error or not and the transmitting side retransmits data when the received data has an error. Namely, when receiving data from the transmitting side without an error, the receiving side transmits an ACK to the transmitting side and when receiving data from the transmitting side with an error, the receiving side transmits a NACK to the transmitting side so that the transmitting side retransmits the data.

In the AMC scheme or the ARQ or HARQ scheme, it is necessary for the receiving side to transmit feedback information such as channel quality information and ACK/NACK to the transmitting side. In this case, the receiving side needs radio resources for transmitting the feedback information to the transmitting side. Since the radio resources for transmitting the feedback information such as channel quality information or ACK/NACK, etc are statically allocated to the receiving side in the code division multiple access (CDMA) communication system, the radio resources once allocated to the receiving side cannot be used for other purposes although it is unnecessary for the feedback information to be transmitted, so that total radio resources are wasted.

DISCLOSURE OF INVENTION

Accordingly, the present invention is directed to a method of transmitting feedback information in a wireless communication system that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of transmitting feedback information at a user equipment (UE) in a wireless communication system comprising a network and a plurality of UEs, the method comprising receiving control information including signaling information necessary for receiving downlink data from the network and radio resource allocation information necessary for transmitting feedback information associated with the downlink data, receiving the downlink data transmitted from the network using the signaling information, and transmitting the feedback information for the downlink data to the network through uplink radio resource indicated by the radio resource allocation information.

In accordance with another embodiment of the present invention, a method of transmitting feedback information at a user equipment (UE) in a wireless communication system comprising a network and a plurality of UEs, the method comprising receiving information associated with a time-frequency region for transmitting feedback information related with downlink data, the time-frequency region being dynamically allocated by the network, receiving the downlink data from the network, and transmitting the feedback information for the downlink data to the network on the time-frequency region.

In accordance with another embodiment of the present invention, a method of supporting feedback information transmission at a network in a wireless communication system comprising a network and a plurality of UEs, the method comprising transmitting control information to at least one UE, the control information including signaling information necessary for receiving downlink data and radio resource allocation information necessary for transmitting feedback information associated with the downlink data, transmitting the downlink data to the at least one UE in accordance with the signaling information, and receiving the feedback information for the downlink data from the at least one UE through uplink radio resource indicated by the radio resource allocation information.

In accordance with another embodiment of the present invention, a method of supporting feedback information transmission at a network in a wireless communication system comprising a network and a plurality of UEs, the method comprising transmitting information a associated with a time-frequency region for transmitting feedback information related with downlink data to a UE, the time-frequency region being dynamically allocated by the network, transmitting the downlink data to the UE, and receiving the feedback information for the downlink data from the UE on the time-frequency region.

The feedback information may include at least one of channel quality information and ACK/NACK. Preferably, the wireless communication system is an orthogonal frequency division multiplexing (OFDM) or orthogonal frequency division multiple access (OFDMA) system and the radio resource allocation information is information associated with a time-frequency region for transmitting the feedback information.

The feedback information can be transmitted through a control information transmission region. Alternatively, the feedback information can be transmitted with traffic data through a data transmission region. The signaling information may include an identifier of the UE or a service transmitted to the UE and downlink transport format and rate information (TFRI) and information associated with a time-frequency region through which the downlink data is transmitted.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A and 3B are diagrams illustrating preferred embodiments of the present invention.

BEST MODE FOR CARRYING OUT THE INVENTION

Reference will now be made in detail to the preferred embodiments of the present invention, examples of which are illustrated in the accompanying drawings.

Figure 1:
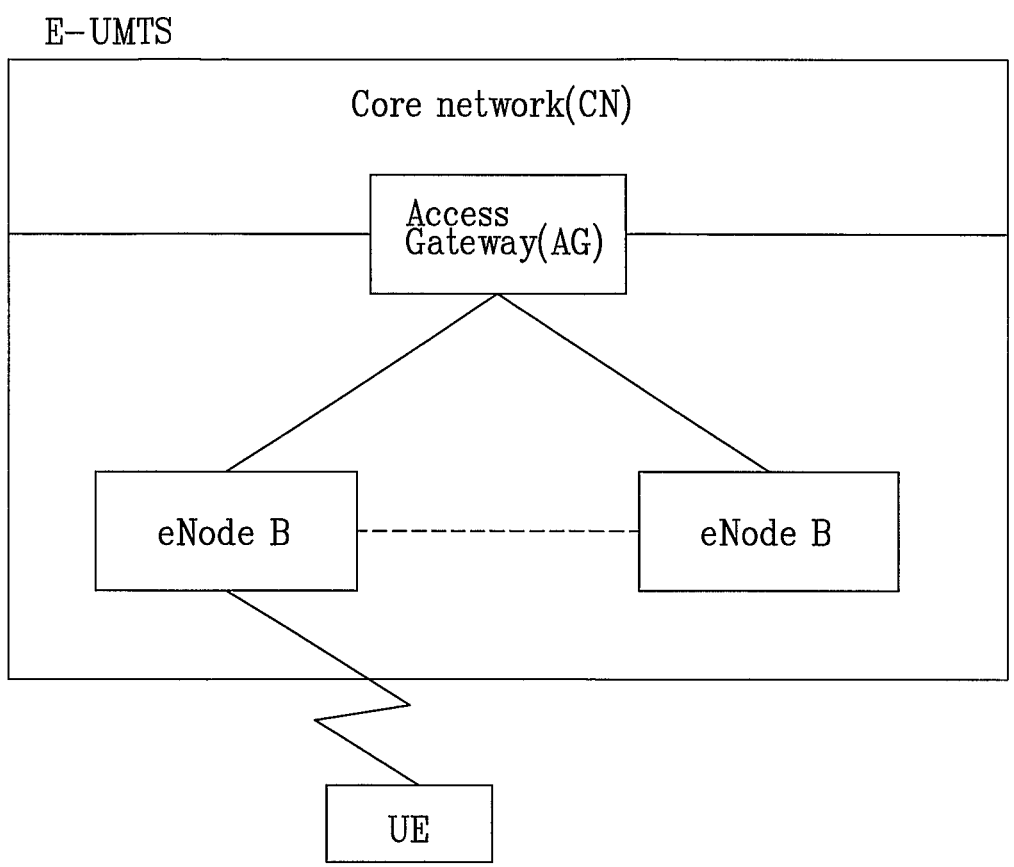
FIG. 1 is a block diagram of a network structure of E-UMTS (evolved universal mobile telecommunications system)

FIG. 1 is a block diagram of a network structure of an E-UMTS (Evolved-Universal Mobile Telecommunications System) to which technical features of the present invention are applied. An E-UMTS is a system evolving from the conventional UMTS and its basic standardization is currently handled by the 3GPP (3$^{rd}$ Generation Partnership Project). The E-UMTS can also be called an LTE (Long Term Evolution) system.

Referring to FIG. 1, an E-UMTS network includes a user equipment (hereinafter abbreviated 'UE'), a base station (hereinafter named 'eNode B' or 'eNB') and an access gateway (hereinafter abbreviated 'aGW') connected to an external network by being located at an end of the E-UMTS network. The aGW may be classified into a part for handling user traffic and a part for handling control traffic. A first aGW for processing new user traffic may communicate with a second AG for processing control traffic via a new interface. A eNode-B may include at least one cell. A first interface for transmitting user traffic or a second interface for transmitting control traffic may be located between several eNode-Bs. The CN may include the aGW and a plurality of nodes for registering users of User Equipments (UEs). If required, another interface for discriminating between the E-UTRAN and the CN may also be used for the LTE network. The aGW manages mobility of a UE by unit of a tracking area (TA). A TA comprises a plurality of cells. When a UE moves into a TA from another TA, the UE informs the aGW of the change of the TAs. The eNode B includes at least one cell.

Layers of a radio interface protocol between a UE and a network can be classified into a first layer L1, a second layer L2 and a third layer L3 based on three lower layers of OSI (open system interconnection) reference model widely known in communication systems. A physical layer belonging to the first layer L1 provides an information transfer service using a physical channel. A radio resource control (hereinafter abbreviated 'RRC') located at the third layer plays a role in controlling radio resources between the UE and the network. For this, the RRC layer enables RRC messages to be exchanged between the UE and the network. The RRC layer can be distributively located at network nodes including an eNode B, an AG and the like or at either the Node B or the AG independently.

Figure 2:
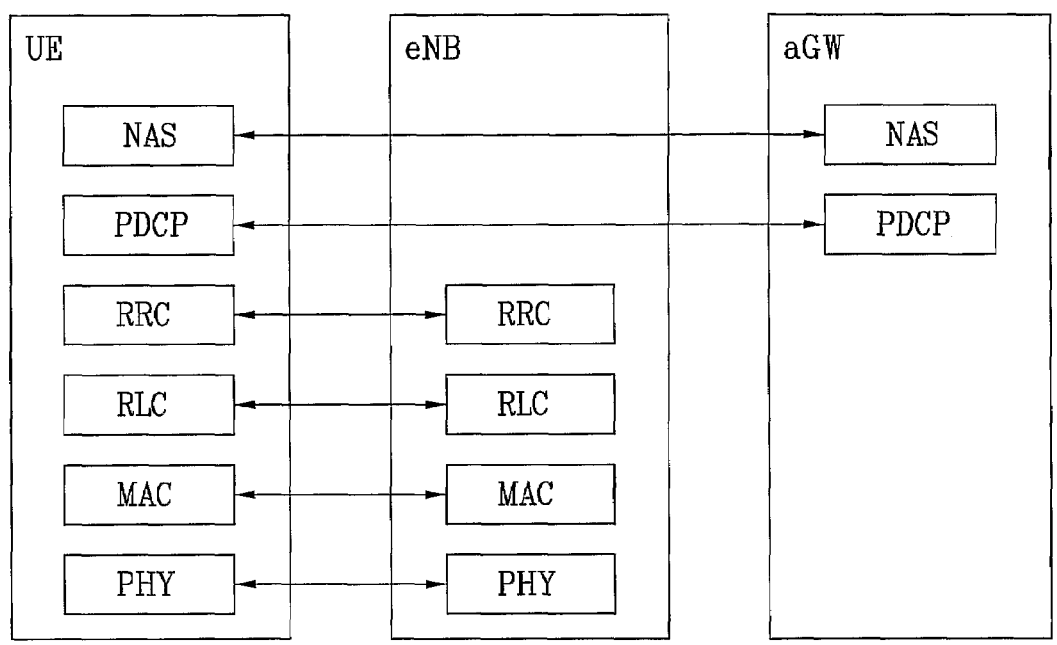
FIG. 2 is an architectural diagram of a radio interface protocol between UE (user equipment) and UTRAN (UMTS terrestrial radio access network) based on the 3GPP radio access network standard.

FIG. 2 is an architectural diagram of a radio interface protocol between a user equipment (UE) and a UMTS terrestrial radio access network (UTRAN) based on the 3GPP radio access network standard. Referring to FIG. 2, a radio interface protocol vertically includes a physical layer, a data link layer, and a network layer and horizontally includes a user plane for data information transfer and a control plane for signaling transfer. The protocol layers in FIG. 2 can be classified into a first layer (L1), a second layer (L2), and a third layer (L3) based on three lower layers of the open system interconnection (OSI) standard model widely known in the communications systems.

First, the physical layer as the first layer provides information transfer service to an upper layer using physical channels. The physical layer (PHY) is connected to a medium access control (hereinafter abbreviated 'MAC') layer above the physical layer via transport channels. Data are transferred between the medium access control layer and the physical layer via the transport channels. Moreover, data is transferred between different physical layers, and more particularly, between one physical layer of a transmitting side and the other physical layer of a receiving side via the physical channels. A downlink physical channel of the E-UMTS is modulated according to an orthogonal frequency division multiplexing (OFDM) scheme and time and frequency are used as radio resources.

The medium access control (hereinafter abbreviated 'MAC') layer of the second layer provides a service to a radio link control (hereinafter abbreviated RLC) layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter abbreviated 'RRC') layer located on a lowest part of the third layer is defined in the control plane only and is associated with configuration, reconfiguration and release of radio bearers (hereinafter abbreviated 'RBs') to be in charge of controlling the logical, transport and physical channels. In this case, the RB means a service provided by the second layer for the data transfer between the UE and the UTRAN.

As a downlink transport channel carrying data to UEs from the network, there is a broadcast channel (BCH) carrying system information and a downlink shared channel (SCH) carrying user traffic or control messages. The traffic or control messages of a downlink multicast or broadcast service can be transmitted via the downlink SCH or a additional downlink multicast channel (MCH). Meanwhile, as an uplink transport channel carrying data to the network from UEs, there is a random access channel (RACH) carrying an initial control message and an uplink shared channel (UL-SCH) carrying user traffic or control message.

As a logical channel located on an upper part of the transport channels, there is a broadcast channel (BCCH), a paging control channel (PCCH), a common control channel (CCCH), a multicast control channel (MCCH) or a multicast traffic channel (MTCH), etc.

Figure 3A:
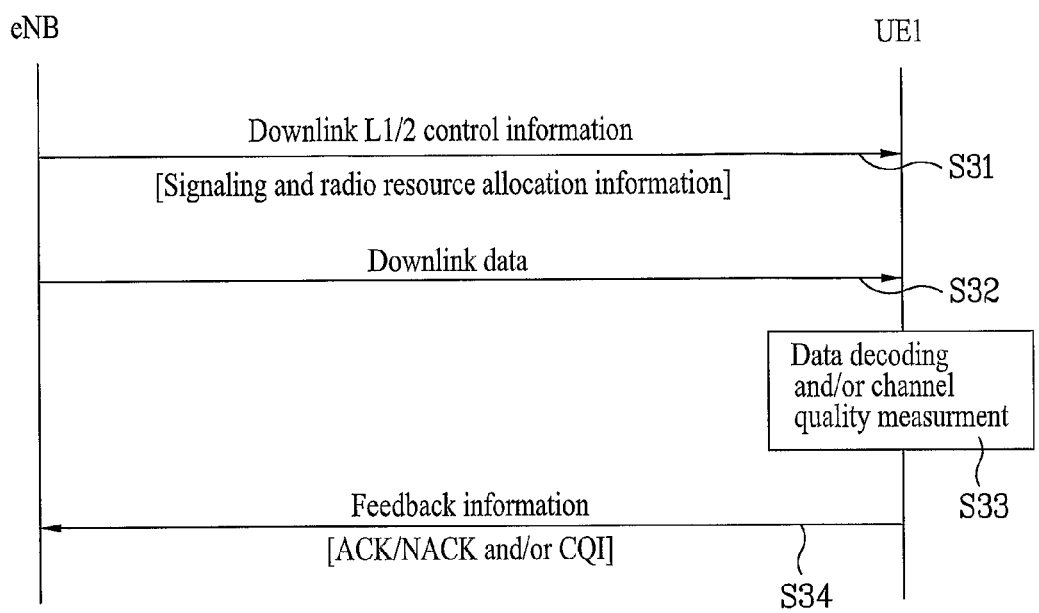

FIG. 3A is a flow diagram illustrating an embodiment of the present invention and FIG. 3B is a diagram for describing the embodiment on time-frequency plane.

In the E-UMTS system, an OFDM is used on the downlink and a single carrier frequency division multiple access (SC-FDMA) on the uplink. The OFDM scheme using multiple carriers allocates resources by unit of multiple subcarriers including a group of carriers and utilizes an orthogonal frequency division multiple access (OFDMA) as an access scheme.

A physical layer of an OFDM or OFDMA scheme divides active carriers into a plurality of groups and transmits each group to a different receiving side. Radio resource allocated to each UE which is defined as a time-frequency region on a two-dimensional sphere comprises continuous subcarriers on a frequency axis and symbols on a time axis. A time-frequency region in the OFDM or OFDMA scheme is a rectangular form sectioned by time and frequency coordinates. One or more time-frequency region can be allocated to an uplink for a UE and an eNB can transmit one or more time-frequency region to a UE. In order to define a time-frequency region on the two-dimensional sphere, the number of OFDM symbols and subcarriers starting from a point having an offset from a reference point should be given.

The E-UMTS uses 10 ms radio frame comprising 20 sub-frames. Namely, a sub-frame is 0.5 ms length. A resource block comprises one sub-frame and twelve subcarriers, each of which is 15 kHz. One sub-frame comprises a plurality of OFDM symbols and a part of the plurality of OFDM symbols can be used for L1/2 control information. In FIG. 3B, a sub-frame comprises a L1/2 control information transmission region (the hatching part) and a data transmission region (the non-hatching part).

Referring to FIGS. 3A and 3B, an eNB of a network transmits downlink L1/2 control information to a UE1 via the 'A' region of FIG. 3B [S31]. The downlink L1/2 control information includes signaling information with which the UE1 receives downlink data from the network and uplink radio resource allocation information with which the UE1 transmits feedback information for the downlink information to the network. More particularly, the downlink L1/2 information may include information as follows.

1) A UE identity or service identity: An identity of a service for which the downlink L1/2 control information will be used or a UE which will use the downlink L1/2 control information is included in the downlink L1/2 control information. In case of the UE identity, a cell level identity such as a C-RNTI allocated and managed by a cell or a tracking area (TA) level identity allocated and managed by unit of a TA can be included.

2) HARQ and ARQ information: HARQ and ARQ information corresponding to the UE identity or the service identity is included in the downlink L1/2 control information.

3) Downlink TFRI information and downlink scheduling information for data transmission: Downlink transport format and rate information (TFRI) including modulation and coding information, transport block sizes and transport block set sizes, and information associated with time (sub-frame or symbol) and frequency (sub-carrier) through which the downlink data is transmitted is included in the downlink L1/2 control information. The TFRI and the information of time and frequency (time-frequency region information like the 'B' region in FIG. 3B) corresponds to the UE identity or the service identity.

4) Uplink radio resource allocation information for feedback information: Uplink radio resource information for transmitting feedback information corresponding to the UE identity or the service identity is included in the downlink L1/2 control information. The uplink radio resource information is associated with information on time (sub-frame or symbol) and frequency (sub-carrier) allocated for the feedback information such as ACK/NACK information and/or channel quality information during a scheduling duration. The uplink radio resource allocation information may include a period and a condition for reporting the channel quality information, and the number of repetition when the feedback information is repeatedly transmitted.

The eNB periodically transmits scheduling information to UE1 at every scheduling period for transmitting the downlink data. The scheduling information can be transmitted at a point i.e. at a specific sub-carrier and symbol during a transmission time interval (TTI) (e.g. a sub-frame of 0.5 ms). Accordingly, the eNB may perform scheduling of data transmission for a plurality of UEs at every TTI or sub-frame. Preferably, scheduling information for a UE can be transmitted with a longer period including a plurality of TTIs or sub-frames considering capability of the UE or the eNB. For this, the eNB sets up a length and a starting point of the period and transmits information on the length and the starting point to the UE. The starting point of the period can be represented as an offset from a reference point.

The eNB may consider discontinuous reception (DRX) operation of the UE1 for determining the scheduling period. Namely, the scheduling period can be set up to be equal to the DRX cycle or multiple times of the DRX cycle so that the DRX operation of the UE1 can become efficient. The scheduling information includes uplink scheduling information for uplink data transmission and downlink scheduling information for downlink data transmission.

The eNB transmits downlink data to the UE1 in accordance with the downlink TFRI information and the scheduling information for downlink data transmission included in the downlink L1/2 control information [S32]. In other words, the eNB transmits the downlink data having data formats indicated by the downlink TFRI information to the UE1 through the 'B' region of the FIG. 3B.

The UE1 tries periodically to receive the downlink L1/2 control information at every scheduling period set up by the eNB [S31]. The UE1 receives the downlink L1/2 information periodically and determines whether the UE or service identity included in the downlink L1/2 control information is identical to a UE identity or service identity stored in the UE1.

When the UE identity or the service identity included in the downlink L1/2 control information is identical to that of the UE1, the UE1 receives the downlink data using the TFRI information and the HARQ/ARQ information, etc included in the downlink L1/2 control information [S32].

The UE1 decodes the received downlink data and determines whether the decoded data has an error [S33]. For example, error detection code like cyclic redundancy check (CRC) code can be used for detecting the error of the received downlink data. The UE1 may measure channel quality between the UE1 and the eNB. For example, a bit error rate (BER), a frame error rate (FER) or reception power of the received downlink data or reference signals can be used for measuring the channel quality.

The UE1 transmits an ACK or a NACK as feedback information to the received downlink data to the eNB [S34]. The UE1 may also transmit channel quality information periodically or non-periodically as the feedback information to the eNB. The channel quality information can be transmitted in a form of a channel quality indicator (CQI). The feedback information is transmitted using uplink radio resource allocated by the uplink radio resource allocation information included in the downlink L1/2 control information received from the eNB. In FIG. 3B, the 'D' region is a time-frequency region through which uplink L1/2 control information is transmitted to the eNB and the feedback information can be included in the uplink L1/2 control information to be transmitted. Alternatively, the 'D' region in FIG. 3B is a time-frequency region through which the UE1 transmits uplink data to the eNB and the feedback information can be included in the uplink data in a form of a control protocol data unit (PDU) or a piggyback protocol data unit (PDU).

When the downlink L1/2 control information includes a period and a condition for reporting the channel quality information, and the number of repetition when the feedback information is repeatedly transmitted, the UE1 transmits the feedback information according to the information.

Figure 4A:
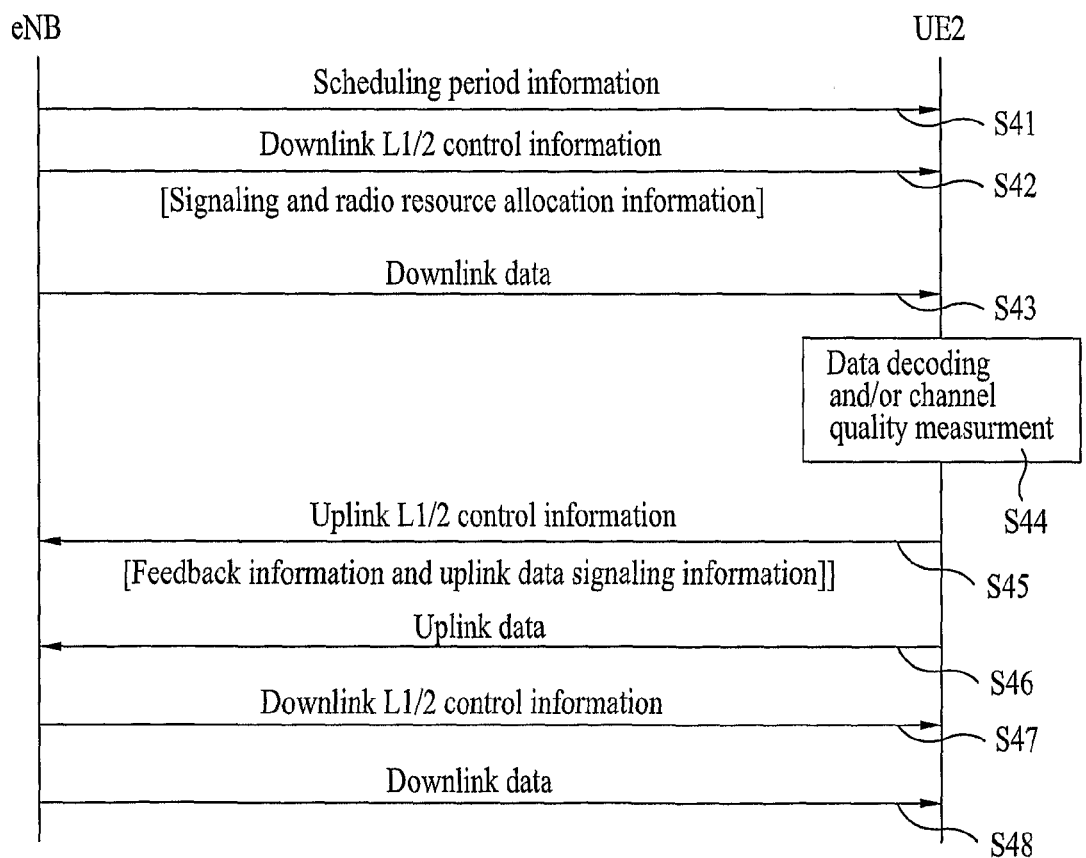
FIG. 4A and FIG. 4B are diagrams illustrating another preferred embodiments of the present invention.
Figure 4B:
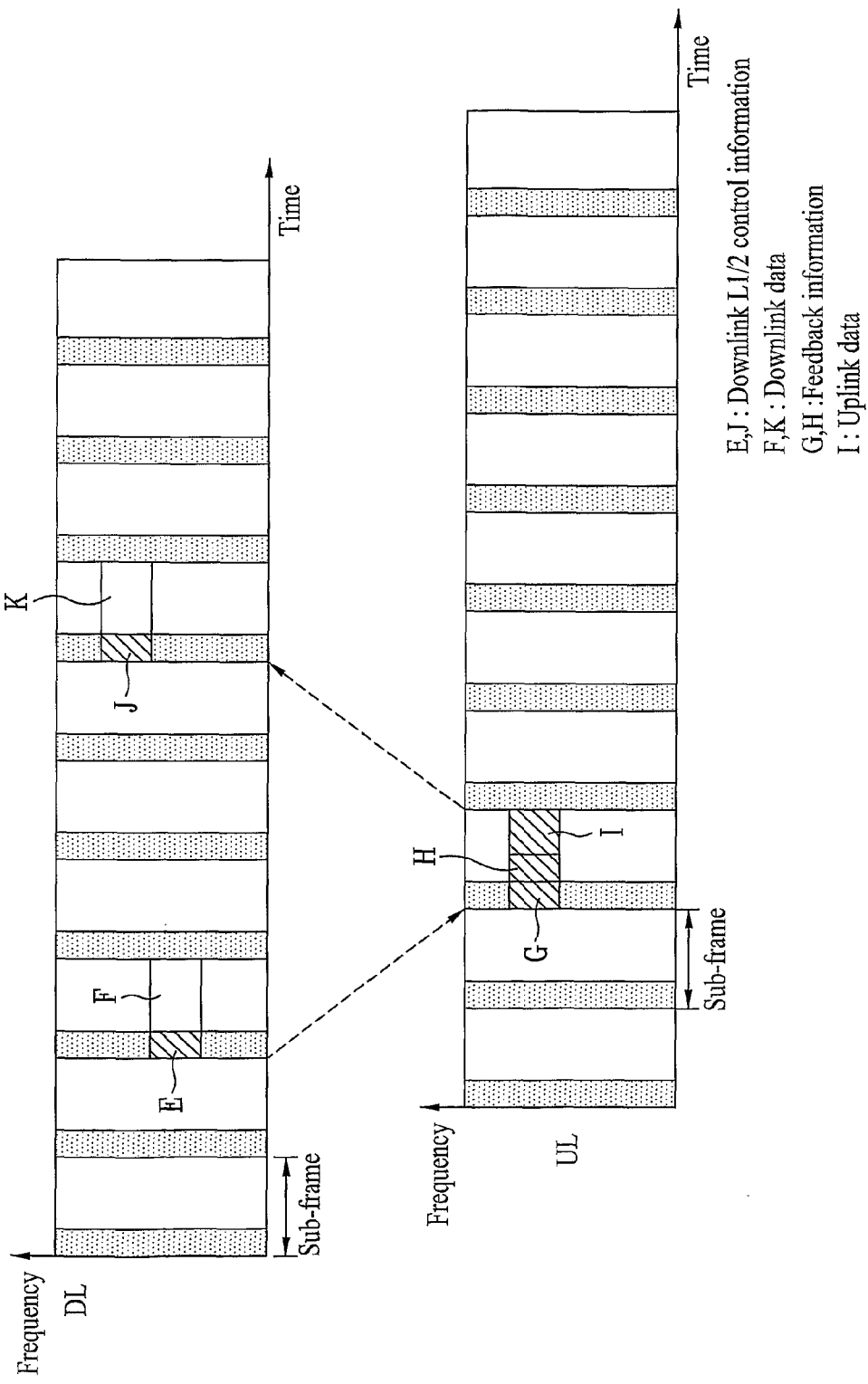

FIG. 4A is a flow diagram illustrating another embodiment of the present invention and FIG. 4B is a diagram for describing the embodiment on time-frequency plane.

Referring to FIGS. 4A and 4B, an eNB transmits scheduling period information to a UE2 [S41]. The eNB transmits downlink L1/2 control information in accordance with the scheduling period on the 'E' region of FIG. 4B [S42]. It is possible for the scheduling period information to be included in the downlink L1/2 control information.

The downlink L1/2 control information includes signaling information with which the UE2 receives downlink data from the network and uplink radio resource allocation information with which the UE2 transmits feedback information for the downlink information to the network. Other information described in the embodiment of FIGS. 3A and 3B can be included in the downlink L1/2 control information.

The UE2 tries periodically to receive the downlink L1/2 control information at every scheduling period set up by the eNB [S42]. The UE2 receives the downlink L1/2 information periodically and determines whether the UE or service identity included in the downlink L1/2 control information is identical to a UE identity or service identity stored in the UE2.

When the UE identity or the service identity included in the downlink L1/2 control information is identical to that of the UE2, the UE2 receives the downlink data using the TFRI information and the HARQ/ARQ information, etc included in the downlink L1/2 control information [S43].

The UE2 decodes the received downlink data and determines whether the decoded data has an error [S44]. The UE2 transmits an ACK or a NACK as feedback information to the received downlink data to the eNB [S45]. The UE2 may also transmit channel quality information periodically or non-periodically as the feedback information to the eNB. The channel quality information can be transmitted in a form of a channel quality indicator (CQI). The feedback information is transmitted using uplink radio resource allocated by the uplink radio resource allocation information included in the downlink L1/2 control information received from the eNB. In FIG. 4B, the 'G' region is a time-frequency region on which uplink L1/2 control information is transmitted to the eNB and the feedback information can be included in the uplink L1/2 control information to be transmitted. Alternatively, the 'H' region in FIG. 4B is a time-frequency region on which the UE2 transmits uplink data to the eNB and the feedback information can be included in the uplink data in a form of a control protocol data unit (PDU) or a piggyback protocol data unit (PDU). The upper L1/2 control information transmitted from the UE2 to the eNB may include information as follows.

1) Scheduling information for uplink transmission: The uplink scheduling information which is transmitted by the UE2 and used a scheduler located in the eNB includes a logical channel identity and UE buffer occupancy, etc.

2) Uplink TFCI information: The uplink TFCI information which is necessary for decoding the uplink data includes information associated with a modulation and coding scheme, transport block sizes, and transport block set sizes, etc.

3) HARQ and ARQ information

4) Happy bit: The happy bit is necessary for informing the eNB that uplink radio resource allocated by the eNB for uplink data transmission of the UE2 is insufficient.

The UE2 transmits the uplink data to the eNB according to the uplink L1/2 control information on the 'T' region of FIG. 4B [S46]. The eNB receives the uplink L1/2 control information and then receives the uplink data using the received the uplink L1/2 control information.

The eNB transmits downlink L1/2 control information to the UE2 on the 'J' region of FIG. 4B [S47]. The downlink L1/2 control information includes an ACK or NACK for the uplink data transmitted by the UE2. The UE2 receives the downlink L1/2 control information and determines a UE identity or a service identity included in the downlink L1/2 control information is identical to an identity stored in the UE2. If the identities are identical and the downlink L1/2 control information includes an ACK for the uplink data, the UE2 realizes that uplink data transmission is successful. If the identities are identical and the downlink L1/2 control information includes a NACK for the uplink data, the UE2 retransmits the uplink data.

The eNB may transmit downlink data to the UE2 on the 'K' region at the same time of transmitting feedback information for the uplink data [S48]. In this case, the scheduling period for the downlink data transmission is identical to a timing point of transmitting the feedback information for the uplink data transmission. The UE2 receives the downlink data using the TFRI information and the HARQ/ARQ information, etc included in the downlink L1/2 control information.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention is applicable to such a wireless communication system as wireless Internet, mobile communication system and the like.

The invention claimed is:

1. A method of transmitting feedback information at a user equipment in a wireless communication system, the method comprising:

receiving periodically information related to a scheduling period for downlink data transmission and a starting point of the scheduling period from a base station;

wherein the scheduling period is set to multiple times of a discontinuous reception (DRX) cycle;

receiving downlink control information including resource allocation information for reporting of channel quality information (CQI) in a subframe, wherein the downlink control information is received from the base station through a control information transmission region, the downlink control information transmission region is immediately followed by a data transmission region in a time domain of the subframe, wherein the downlink control information further comprises a cell-radio network Temporal identifier (C-RNTI) corresponding to the user equipment, a number of CQI repetition transmissions, a size of a set of transport blocks and information associated with a symbol within the subframe assigned for transmission of scheduled downlink data in the time domain;

receiving the scheduled downlink data based on the downlink control information and the scheduling period;

transmitting, uplink control information including information indicating that an uplink resource allocated for uplink data transmission is insufficient, to the base station;

transmitting non-periodically reporting of the CQI to the base station via an uplink data transmission region indicated by the resource allocation information according to the downlink control information, and wherein CQI is included in uplink data.

2. The method of claim 1, wherein the uplink control information further includes a logical channel identity or a buffer occupancy of the user equipment.

3. The method of claim 1, further comprising:

receiving signaling information including a UE identity or a service identity, downlink transport format and rate information (TFRI).

4. The method of claim 1, wherein the scheduling period and the starting point of the scheduling period is set based on a capability of the UE.

5. The method of claim 1, wherein the downlink control information further comprises information associated with subcarriers assigned for transmission of scheduled downlink data in the time domain.

* * * * *